US012523612B2

(12) United States Patent
Chen et al.

(10) Patent No.: US 12,523,612 B2
(45) Date of Patent: Jan. 13, 2026

(54) SELF-POWERED, PORTABLE, AND HIGH-THROUGHPUT SERS BIOSENSING PLATFORM

(71) Applicant: GUANGDONG OCEAN UNIVERSITY, Guangdong (CN)

(72) Inventors: Ge Chen, Zhanjiang (CN); Wei Wang, Zhanjiang (CN); Ningxia Yin, Zhanjiang (CN); Sihua Yin, Zhanjiang (CN)

(73) Assignee: GUANGDONG OCEAN UNIVERSITY, Guangdong (CN)

( * ) Notice: Subject to any disclaimer, the term of this patent is extended or adjusted under 35 U.S.C. 154(b) by 167 days.

(21) Appl. No.: 18/568,269

(22) PCT Filed: Sep. 7, 2023

(86) PCT No.: PCT/CN2023/117466
§ 371 (c)(1),
(2) Date: Dec. 7, 2023

(87) PCT Pub. No.: WO2025/050353
PCT Pub. Date: Mar. 13, 2025

(65) Prior Publication Data
US 2025/0093268 A1    Mar. 20, 2025

(30) Foreign Application Priority Data
Sep. 5, 2023  (CN) .......................... 202311134503.3

(51) Int. Cl.
*G01N 21/65* (2006.01)
*G01N 27/327* (2006.01)
*H02N 1/04* (2006.01)

(52) U.S. Cl.
CPC ......... *G01N 21/658* (2013.01); *G01N 27/327* (2013.01); *H02N 1/04* (2013.01)

(58) Field of Classification Search
CPC ....... G01N 21/658; G01N 27/327; H02B 1/04
See application file for complete search history.

(56) References Cited

U.S. PATENT DOCUMENTS

2011/0128536 A1 *  6/2011  Bond .................. B81C 1/00373
                                                        430/324
2021/0285089 A1 *  9/2021  Xiao ..................... C23C 14/024

FOREIGN PATENT DOCUMENTS

| CN | 105973866 A | * | 9/2016 | ........... G01N 21/658 |
| EP | 3401670 A1 | * | 11/2018 | ................ G01J 3/44 |

OTHER PUBLICATIONS

Gao, Along, et al. "Plasmonic Cavity for Self-Powered Chemical Detection and Performance Boosted Surface-Enhanced Raman Scattering Detection." ACS Applied Materials & Interfaces 15.30 (2023): 35939-35949. (Year: 2023).*

(Continued)

*Primary Examiner* — Dominic J Bologna
(74) *Attorney, Agent, or Firm* — Tutunjian & Bitetto. P.C.

(57) ABSTRACT

The present disclosure provides a self-powered, portable, and high-throughput Surface-Enhanced Raman Spectroscopy (SERS) biosensing platform, including: a handheld Raman spectrometer, a friction nanogenerator, a superhydrophobic metal substrate, and a high-voltage electrode array. The friction nanogenerator has one end connected to the superhydrophobic metal substrate, and the other end connected to the high-voltage electrode array. The high-voltage electrode array is disposed above the superhydrophobic metal substrate. The friction nanogenerator is used for providing an alternating voltage to the high-voltage electrode array. The high-voltage electrode array is used for oscillating droplets on the superhydrophobic metal substrate according to the alternating voltage, and generating an eddy current to heat the droplets and accelerate evaporation of the (Continued)

droplets. The handheld Raman spectrometer is used for detecting the enriched droplets, to obtain a SERS spectrum of an analyte.

7 Claims, 7 Drawing Sheets

(56) References Cited

OTHER PUBLICATIONS

English machine translation of CN105973866A (Year: 2016).*

* cited by examiner

SELF-POWERED, PORTABLE, AND HIGH-THROUGHPUT SERS BIOSENSING PLATFORM

CROSS REFERENCE TO RELATED APPLICATION

This patent application is a national stage application of International Patent Application No. PCT/CN2023/117466, filed on Sep. 7, 2023, which claims the benefit and priority of Chinese Patent Application No. 202311134503.3, filed with the China National Intellectual Property Administration on Sep. 5, 2023, the disclosure of which is incorporated by reference herein in its entirety as part of the present application.

TECHNICAL FIELD

The present disclosure relates to the technical field of digital microfluidics, and in particular to a self-powered, portable, and high-throughput Surface-Enhanced Raman Spectroscopy (SERS) biosensing platform.

BACKGROUND

In recent years, Surface-Enhanced Raman Spectroscopy (SERS) has become a powerful tool for fingerprint identification of whole organism in the field of biotechnology. It allows for the rapid, label-free, and non-destructive identification of various chemical and biological analytes. On the other hand, samples to be tested can be rapidly and flexibly handled in the form of microdroplets (μL or nL) on a digital microfluidic chip. In other words, digital microfluidics provides the capability for precise sample pretreatment, while SERS offers a fast and sensitive detection method. By fully utilizing these characteristics, the portable SERS analysis technology is combined with digital microfluidics to achieve the goals of portability, high throughput, high sensitivity, and rapid analysis with small sample quantities. Therefore, SERS-digital microfluidic biosensors align with the development trends in modern analytical technology and show excellent potential for on-site and real-time detection in fields such as ocean monitoring, food safety, and control of infectious diseases (e.g., COVID-19).

In the SERS-digital microfluidic system, it is typically necessary to control the gap between plasmonic metal nanostructures below 10 nm to create effective signal-enhancing "hotspots." At the same time, it is also necessary to further transport target molecules to the "hotspot" region to achieve better Raman enhancement. Currently, there are two main strategies. The first one involves directly integrating plasmonic metal nanostructures with the substrate and then depositing target molecules onto the "hotspot" region through droplet evaporation, thereby obtaining enhanced Raman spectroscopy signals. However, the high processing requirements for creating plasmonic metal nanostructures on the substrate and effectively controlling relevant gaps impose significant limitations on its applications.

In response to this, scientists have begun to explore new methods based on the self-assembly of plasmonic metal nanoparticles and target analytes within droplets. Throughout this process, the droplets can transport the target analytes to the "hotspot" region of the plasmonic nanostructures through the enrichment effect by evaporation, significantly enhancing Raman detection signals. Therefore, the deposition distribution of nanoparticles after enrichment plays a crucial role in the detection performance, and the deposition distribution is primarily influenced by the adhesion between the droplets and the substrate during the contact process. In other words, the surface wetting properties of the substrate and the residence time of the droplets in the contact area with the substrate are two key influencing factors. Therefore, in SERS-digital microfluidic systems, substrates can be divided into four major categories based on the wetting characteristics: common hydrophobic SERS substrates, superhydrophobic SERS substrates, liquid-infused surface SERS substrates, and superhydrophobic-superhydrophilic micro-patterned SERS substrates. Furthermore, based on whether the droplets remain static on the substrate, the enrichment can be classified into static enrichment and dynamic enrichment.

For the common hydrophobic substrate, during the evaporation process, the three-phase contact line (TCL) is pinned, and for the flattened semi-spherical droplets on the substrate, due to a higher evaporation rate at the edges than at the center, an internal flow field (known as Deegan flow) that radially flows outwards to the boundary dominates, in order to compensate for the faster evaporation losses at the edges. Consequently, the nanoparticles within the droplet, driven by the radial flow, ultimately concentrate at the three-phase contact line, forming a "coffee ring pattern" around the periphery of the droplet. Due to the close accumulation of plasmonic metal nanoparticles and analytes on the ring, enhanced Raman signals can be obtained.

For the superhydrophobic substrate, droplets thereon tend to be nearly spherical. As a result, the solid-liquid contact area between the droplet and the substrate is relatively small. Additionally, as the droplet evaporates, due to the extremely low contact angle hysteresis, the three-phase contact line can recede and slip. Therefore, the nanoparticles within the droplet can ultimately be concentrated into a smaller area. Furthermore, in the spherical droplet state, another flow mechanism (known as Marangoni flow) begins to dominate. That is, a central symmetric circulation vortex exists inside the droplet. The circulation vortex can promote a more homogeneous distribution of deposited nanoparticles, allowing more target molecules to be uniformly transported to the "hotspot" region of plasmonic metal nanostructures. However, for static droplets not affected by external energy stimulation, the Marangoni flow inside is generally weaker. Considering the high mobility of droplets on the superhydrophobic substrate, the droplets roll back and forth to further induce an internal vortex field, enhancing the homogenization of internal nanoparticles and achieving better enrichment effects.

For the liquid-infused smooth surface substrate, the air in the microstructures is replaced by the filled lubricating liquid, eliminating the pinning effect of the three-phase contact line and exhibiting a unique liquid-repelling capability. During the evaporation process of the droplet, as the droplet volume and the contact area between the lubricant and the liquid decrease, the contact line keeps receding and slipping stably, allowing the analytes within the droplet to concentrate in a small area after evaporation.

The superhydrophobic-superhydrophilic micro-patterned substrate is obtained by further creating a superhydrophilic micro-pore array on top of the superhydrophobic substrate, thus having a significant capability to anchor microdroplets based on hydrophilic points. During the evaporation process of the droplet, the three-phase contact line of the droplet only pins in small hydrophilic point areas. Consequently, the nanoparticles within the droplet are ultimately concentrated within the region defined by the hydrophilic points. Furthermore, the superhydrophobic regions can act as physical barriers, preventing cross-contamination between adjacent sample microdroplets and maintaining their independence during the detection process. Therefore, superhydrophobic-superhydrophilic micro-patterns have the advantage of high detection throughput.

In general, to achieve highly-sensitive, uniform, and well-linear spectral signals for target molecules in Raman detection, scientists have undertaken extensive research efforts and have achieved certain progress. However, existing research approaches still face many limitations, making it challenging to apply them in practical applications.

For instance, for the common hydrophobic substrate, although droplets can achieve the enrichment of metal nanoparticles and analytes through the coffee-ring effect. The joint effect of the radial flow (Deegan flow) and the gravity makes it difficult to homogeneously deposit metal nanoparticles and analytes with greatly different densities and also causes significant randomness, which, in turn, limits the detection sensitivity and signal uniformity of SERS substrates to a great extent.

Regarding the superhydrophobic surface, the difficulty in anchoring droplets on the substrate makes it challenging to achieve droplet array enrichment, severely restricting detection throughput. Additionally, the superhydrophobic substrate is not suitable for analytes in non-aqueous phases. Furthermore, although internal vortices of static droplets exhibit some homogenization effects, such effects are relatively weak. Therefore, a dynamic enrichment method based on the back-and-forth movement of droplets has been proposed. This method can improve homogenization by converting external energy into vortices, but it requires additional power and a control system to maintain continuous droplet movement. Moreover, as the viscosity of the evaporating droplet increases, nanoparticles are easily adsorbed onto the moving trajectory, leading to the issue of losing detection molecules.

For the liquid-infused smooth surface substrate, the choice of lubricant heavily depends on the characteristics of the porous substrate, droplets, and nanoparticles. Therefore, there are many limitations in practical analysis processes. Additionally, the use of lubricant inevitably leads to contamination of the droplets, and the lubricant is also deposited with the enrichment of nanoparticles. This potentially causes background interference signals during Raman measurements For the superhydrophobic-superhydrophilic micro-patterned substrate, the contact line is pinned in hydrophilic regions. The homogeneity of nanoparticles inside the droplet typically falls between that of the hydrophilic substrate and superhydrophobic substrate. During the evaporation process, nanoparticles exhibit better enrichment effects at the three-phase contact line, leading to relatively poor signal uniformity. Furthermore, the superhydrophobic-superhydrophilic micro-patterned substrate is not suitable for some analytes in non-aqueous phases.

The common drawbacks of these liquid droplet-based evaporation enrichment methods are as follows: For static droplets, the homogeneity of nanoparticles inside the droplets is generally low. Consequently, both the uniformity and linearity of detection signals are mediocre. Meanwhile, although dynamic enrichment methods significantly improve the homogenization of droplets on the superhydrophobic substrate, the back-and-forth movement of the droplets can result in nanoparticle loss, thus affecting overall detection performance. Additionally, the requirement for the additional power and control system causes portability. On the other hand, in current research, droplets often undergo natural evaporation, making the entire enrichment process time-consuming. For example, a 20 μL droplet typically requires over 2 hours of enrichment time. Clearly, this contradicts the initial intent of on-site real-time detection. To accelerate droplet enrichment, scientists have begun considering heat-assisted methods. However, existing techniques still have their limitations. For instance, for the hydrophilic and superhydrophobic-superhydrophilic micro-patterned substrate, strong coffee-ring effects occur under heating conditions due to the pinned three-phase contact line, leading to a decrease in detection performance. For the liquid-infused smooth surface substrate, the evaporation of the lubricant caused by heating eventually leads to the issue of contact line pinning, resulting in enrichment failure. Compared with the three types of substrates mentioned above, the superhydrophobic substrate, with dynamic droplets thereon, can effectively suppress the issue of contact line pinning caused by heating. However, the existing back-and-forth movement method can lead to nanoparticle loss.

SUMMARY

To overcome the shortcomings of the prior art, an objective of the present disclosure is to provide a self-powered, portable, and high-throughput SERS biosensing platform.

To achieve the above objective, the present disclosure provides the following technical solutions.

A self-powered, portable, and high-throughput SERS biosensing platform is provided, including:

a handheld Raman spectrometer, a friction nanogenerator, a superhydrophobic metal substrate, and a high-voltage electrode array.

The friction nanogenerator has one end connected to the superhydrophobic metal substrate, and the other end connected to the high-voltage electrode array. The high-voltage electrode array is disposed above the superhydrophobic metal substrate. The friction nanogenerator is used for providing an alternating voltage to the high-voltage electrode array. The high-voltage electrode array is used for oscillating droplets on the superhydrophobic metal substrate according to the alternating voltage, and generating an eddy current to heat the droplets and accelerate evaporation of the droplets. The handheld Raman spectrometer is used for detecting the enriched droplets, to obtain a SERS spectrum of an analyte.

Preferably, the high-voltage electrode array includes a plurality of electrodes arranged at equal intervals.

Preferably, a distance between the electrodes and the superhydrophobic metal substrate is 5 mm.

Preferably, the electrode has a diameter of 2.5 mm.

Preferably, the friction nanogenerator has a peak voltage ranging from 4 kV to 5 kV, and the friction nanogenerator has a rotation speed greater than or equal to 300 r/min.

Preferably, the electrodes are spaced by 5 mm.

Preferably, the droplet has a volume of 7 μL.

According to specific embodiments provided in the present disclosure, the present disclosure has the following technical effects:

The present disclosure provides a self-powered, portable, and high-throughput SERS biosensing platform, including: a handheld Raman spectrometer, a friction nanogenerator, a superhydrophobic metal substrate, and a high-voltage electrode array. The friction nanogenerator has one end connected to the superhydrophobic metal substrate, and the other end connected to the high-voltage electrode array. The high-voltage electrode array is disposed above the superhydrophobic metal substrate. The friction nanogenerator is used for providing an alternating voltage to the high-voltage electrode array. The high-voltage electrode array is used for oscillating droplets on the superhydrophobic metal substrate according to the alternating voltage, and generating an eddy current to heat the droplets and accelerate evaporation of the droplets. The handheld Raman spectrometer is used for detecting the enriched droplets, to obtain a SERS spectrum of an analyte. The present disclosure has six important features: non-destructive enrichment, high throughput, rapid detection, high sensitivity of detection signals, good linearity and uniformity, and no limitations on liquid sample types. This provides a new approach to rapid detection in SERS-digital microfluidics. Furthermore, the present disclosure can be widely applied in various fields, including disease diagnosis, food safety, national security, environmental engineering, and more.

BRIEF DESCRIPTION OF THE DRAWINGS

To describe the technical solutions in embodiments of the present disclosure or in the prior art more clearly, the accompanying drawings required in the embodiments are briefly described below. Apparently, the accompanying drawings in the following description show merely some embodiments of the present disclosure, and other drawings can be derived from these accompanying drawings by those of ordinary skill in the art without creative efforts.

REFERENCE NUMERALS

1: friction nanogenerator; 2: high-voltage electrode array; 3: superhydrophobic metal substrate; 4: handheld Raman spectrometer.

DETAILED DESCRIPTION OF THE EMBODIMENTS

The technical solutions of the embodiments of the present disclosure are clearly and completely described below with reference to the drawings in the embodiments of the present disclosure. Apparently, the described embodiments are merely a part rather than all of the embodiments of the present disclosure. All other embodiments obtained by those skilled in the art based on the embodiments of the present disclosure without creative efforts shall fall within the protection scope of the present disclosure.

In order to make the above objective, features and advantages of the present disclosure clearer and more comprehensible, the present disclosure will be further described in detail below in combination with accompanying drawings and particular implementation modes.

Figure 1:
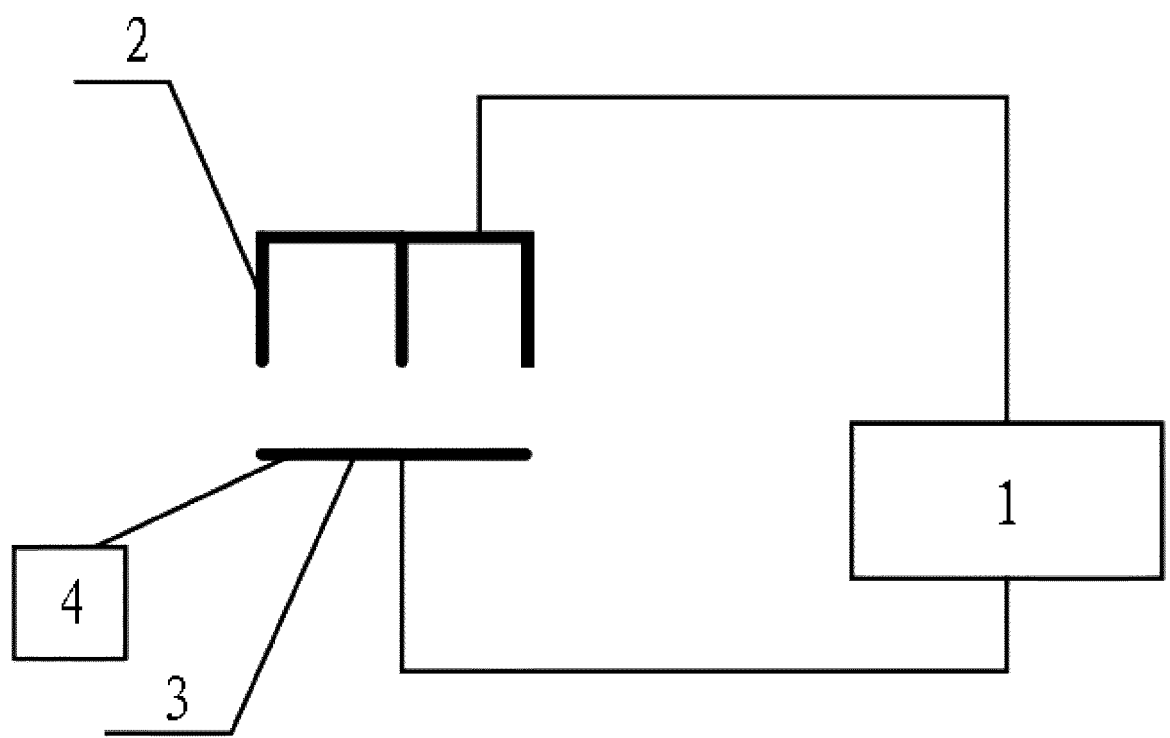
FIG. 1 is a schematic diagram of a connection relationship of a platform according to an embodiment of the present disclosure.

FIG. 1 is a schematic diagram of a connection relationship of a platform according to an embodiment of the present disclosure. As shown in FIG. 1, the present disclosure provides a self-powered, portable, and high-throughput SERS biosensing platform, including:

a handheld Raman spectrometer 4, a friction nanogenerator 1, a superhydrophobic metal substrate 3, and a high-voltage electrode array 2.

The friction nanogenerator 1 has one end connected to the superhydrophobic metal substrate 3, and the other end connected to the high-voltage electrode array 2. The high-voltage electrode array 2 is disposed above the superhydrophobic metal substrate 3. The friction nanogenerator 1 is used for providing an alternating voltage to the high-voltage electrode array 2. The high-voltage electrode array 2 is used for oscillating droplets on the superhydrophobic metal substrate 3 according to the alternating voltage, and generating an eddy current to heat the droplets and accelerate evaporation of the droplets. The handheld Raman spectrometer 4 is used for detecting the enriched droplets, to obtain a SERS spectrum of an analyte.

Figure 2:
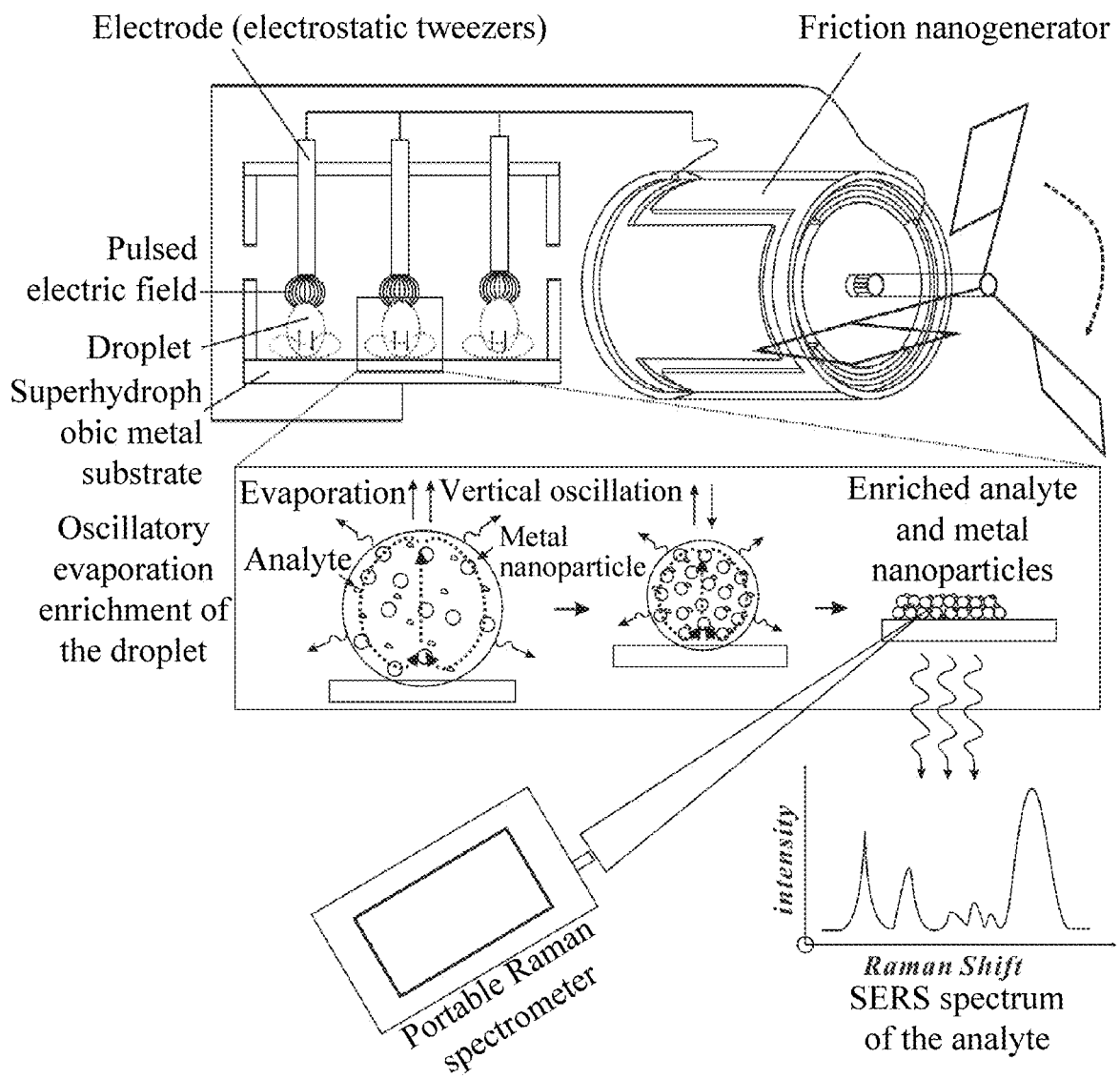
FIG. 2 is a schematic diagram of modules of a portable self-powered SERS biosensing platform according to an embodiment of the present disclosure.

FIG. 2 is a schematic diagram of modules of a portable self-powered SERS biosensing platform according to an embodiment of the present disclosure. As shown in FIG. 2, based on the portability and high-voltage characteristics of a solid-solid friction nanogenerator, this embodiment introduces a portable high-voltage power source capable of collecting wind energy. Based on this, the high-voltage electrode array forms a local potential well, acting as electrostatic tweezers. A corresponding high-throughput droplet array is formed on a superhydrophobic surface by using an electrostatic trapping effect. Under the action of the alternating voltage, the droplets oscillate and evaporate, and thus are enriched. On one hand, the vertical oscillation of the droplets effectively forms an internal self-stirring flow field. On the other hand, the eddy current heating effect of a pulsed electric field accelerates droplet evaporation. As the droplets evaporate, a uniform dynamic enrichment is eventually formed and detection is performed using a portable Raman spectrometer (the handheld Raman spectrometer), thereby achieving self-powered high-throughput SERS biosensing.

Specifically, the friction nanogenerator consists of two main parts: a rotor and a stator. A nylon film (length: 238.8 mm; width: 85 mm; thickness: 60 μm) coated with four layers of copper foil (length: 85 mm; width: 58 mm; thickness: 60 μm) is attached to an inner wall of an acrylic box (inner diameter: 76 mm; thickness: 2 mm; height: 85 mm) to form the stator. The rotor consists of an acrylic box (outer diameter: 70 mm; thickness: 2 mm; height: 76 mm) and identical upper and lower covers (outer diameter: 70 mm; inner diameter: 8 mm; thickness: 3 mm). Two pieces of sponge (length: 82 mm; width: 58 mm; thickness: 3 mm) are attached to the surface of a cylinder and covered with two polytetrafluoroethylene (PTFE) films (length: 82 mm; thickness: 30 μm). A stainless steel shaft is fixed to an inner cylinder and connected to the cover of the outer cylinder through bearings.

Figure 3:
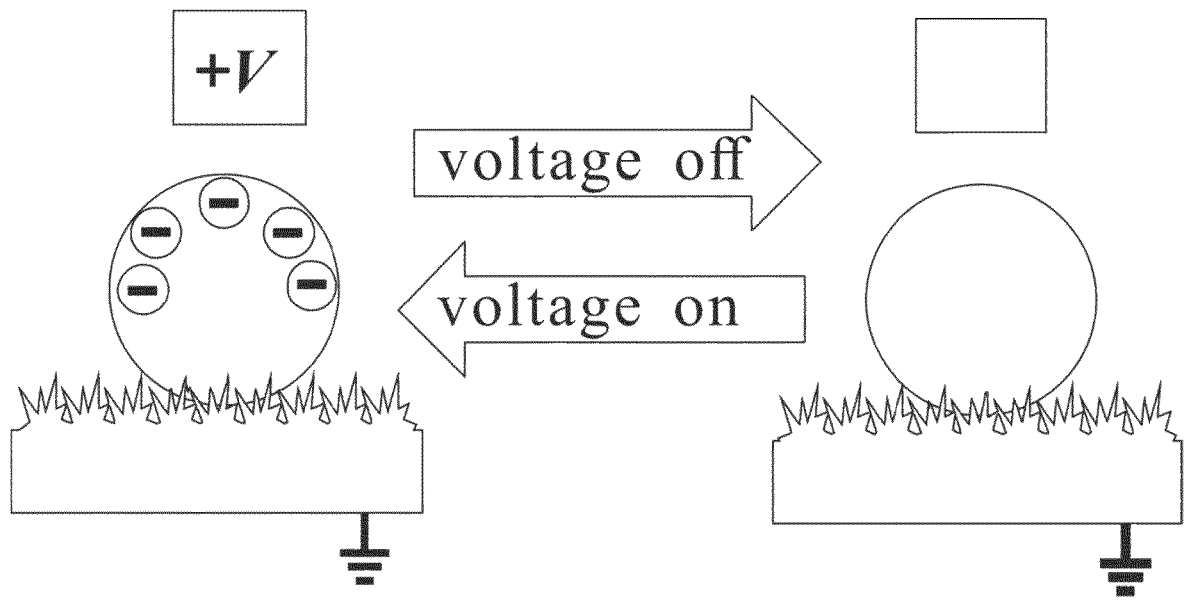
FIG. 3 is a schematic diagram of reversible generation and disappearance of induced charges according to an embodiment of the present disclosure.

FIG. 3 shows the reversible generation and disappearance of induced charges. After the voltage is turned off, the induced charges in the droplets disappear (which are neutralized due to grounding), but are generated again when the voltage is turned on, and this process is reversible.

Figure 4:
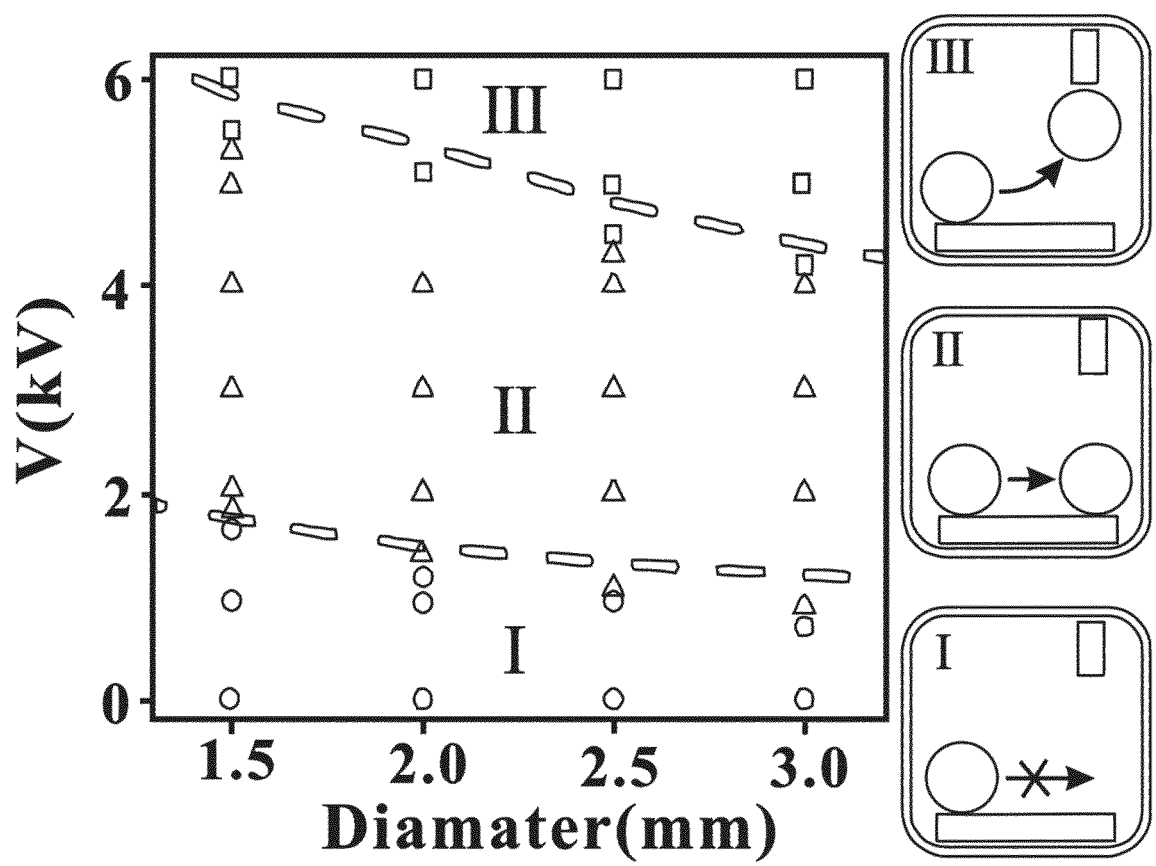
FIG. 4 is a schematic diagram of different dynamic behaviors of droplets at different applied voltages (V) and electrode diameters according to an embodiment of the present disclosure.
Figure 5:
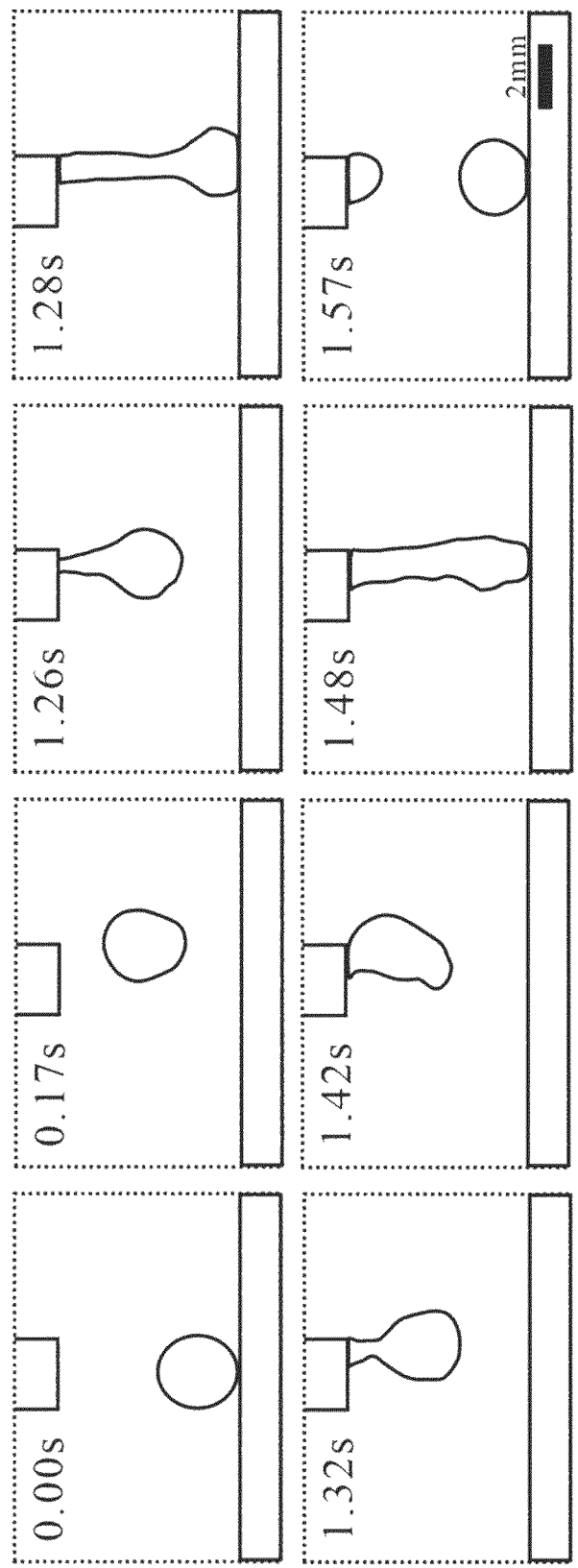
FIG. 5 is a schematic diagram of droplets under a 6 kV open-circuit voltage according to an embodiment of the present disclosure.

FIG. 4 shows a phase diagram of different dynamic behaviors of droplets at different applied voltages (V) and electrode diameters. In region I (circles), the droplets remain stationary. In region II (triangles), the droplets move horizontally towards the tweezers, while in region III (squares), the droplets eventually separate from the surface due to excessive Coulomb forces. The two dashed lines represent the minimum voltages for region II and region III. In FIG. 5, at an open-circuit voltage of 6 kV, the entire droplet (approximately 7 microliters) is lifted onto the tweezers because the electrostatic force is greater than the combined force of gravity and the adhesive force between the droplet and the substrate. At 1.26 seconds, the droplet is in contact with the electrode and acquires a charge with the same polarity as the electrode (conductive charge), resulting in a repulsive force between the tweezers and the droplet. From 1.28 seconds to 1.48 seconds, the droplet extends due to the repulsive force until the bottom of the droplet touches the substrate, and then the droplet bounces up. This process continues for several cycles. At 1.57 seconds, the droplet is split into two parts, with the upper part adhering to the tweezers. In this state, the two sub-droplets continue to attract each other due to electrostatic induction. The distance between the electrode and the substrate is approximately 5 mm. Considering the fluctuation in the peak voltage of the friction nanogenerator around 5 kV, the electrode diameter is set to 2.5 mm.

Figure 6:
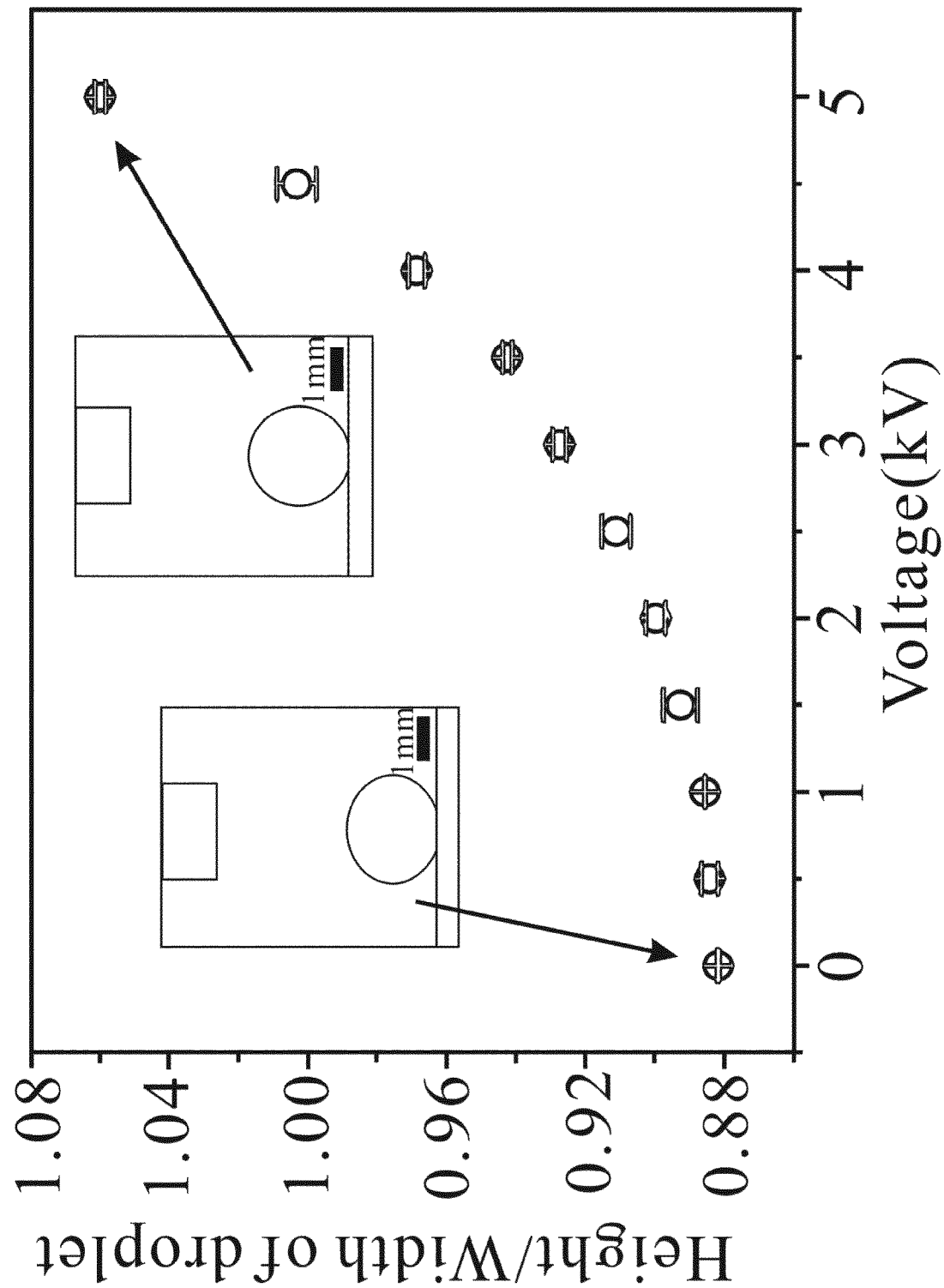
FIG. 6 is a schematic diagram of changes in a height/width ratio of a water droplet under an increasing applied voltage according to an embodiment of the present disclosure.

In FIG. 6, two optical illustrations show that at 5 kV, the shape of the droplet is higher and thinner than at 0 kV, demonstrating the adjusted electrostatic Coulomb force between the tweezers and the droplet. The scale bar in the optical images is 1 millimeter, and the error bar is based on the standard deviation of three tests.

The electrostatic tweezers use a DC power source, while the friction nanogenerator uses a pulsed power source. When the voltage is greater than or equal to 22 kV, the response time of droplet oscillation is almost close to 0 ms. In this experiment, a distance between two electrode plates is 27 mm, which means that the peak electric field intensity needs to be greater than or equal to 0.8 kV/mm to achieve optimal results. In summary, the peak voltage of the friction nanogenerator should be in the range of 4 kV to 5 kV to achieve optimal droplet oscillation. In other words, the rotation speed of the friction nanogenerator should be greater than or equal to 300 r/min to meet the best conditions. Meanwhile, the distance between the electrode and the substrate is approximately 5 mm. Considering that the electrode diameter should be greater than the droplet diameter as far as possible, the electrode diameter is set to 2.5 mm. Since the polarities of the electrodes are the same, repulsive coupling between the electrodes is very small. Therefore, there are no strict requirements on the numerical settings, and the spacing between the electrodes is also set to 5 mm. The volume of the droplet is set to 7 µL.

The back-and-forth movement of droplets on the superhydrophobic surface significantly reduces the residence time of the droplets, which effectively reduces the area where gold/analyte nanoparticles within the droplets are enriched after the droplets evaporate completely, thus enhancing the level of concentration. At the same time, the homogeneous vortex inside the oscillating droplets allows for a uniform distribution of gold/analyte nanoparticles. A uniform distribution of gold nanoparticles can form uniform hotspots, and a uniform distribution of analytes within the hotspots can result in well enhanced and uniformly distributed Raman signals. A response time of droplet oscillation under the electrodes can be almost close to 0 ms, which means that the retention time is close to 0 ms. Meanwhile, a homogeneous symmetrical vortex can be generated inside the oscillating droplets. The droplets only need to oscillate up and down without the need for back-and-forth movement, greatly reducing the residual of substances on the substrate.

Each electrode can form an individual potential well. Therefore, it is convenient to form a high-throughput droplet array by array tapping. The friction nanogenerator is small in size and can collect natural wind energy or ocean current energy for power generation. Therefore, the present disclosure can achieve self-powered, non-destructive, portable, and high-throughput detection of biomolecules on-site in real time.

Furthermore, droplet oscillation can enhance the droplet enrichment rate and reduce the enrichment time. Under a pulsed voltage of 250 volts with a delay time of 25 milliseconds, the evaporation flux of a 3-microliter droplet is 1.47 times greater than that of a 10-microliter droplet (faster oscillation leads to faster evaporation). When the delay time is reduced from 200milliseconds to 25 milliseconds, the evaporation flux of a 3-microliter droplet during oscillation at 250 volts increases by 1.1 times (indicating that the reduction in delay time has a limited impact on droplet evaporation). In the case of a 25-millisecond delay time and a peak voltage of 250 volts for pulsed input, it is observed that the evaporation rate of a 3-milliliter droplet increases by approximately 18% compared to a static droplet. Because a path from the surface of a bottom droplet to a liquid-gas interface is shorter, for smaller droplets, the internal circulation caused by oscillation has a more significant enhancing effect on evaporation, allowing smaller droplets to evaporate at a faster rate. Additionally, a shorter delay time resulting from a higher oscillation frequency leads to a shorter evaporation time. This further enhances the internal circulation, thereby increasing the transfer and evaporation rates within the droplets.

Figure 7:
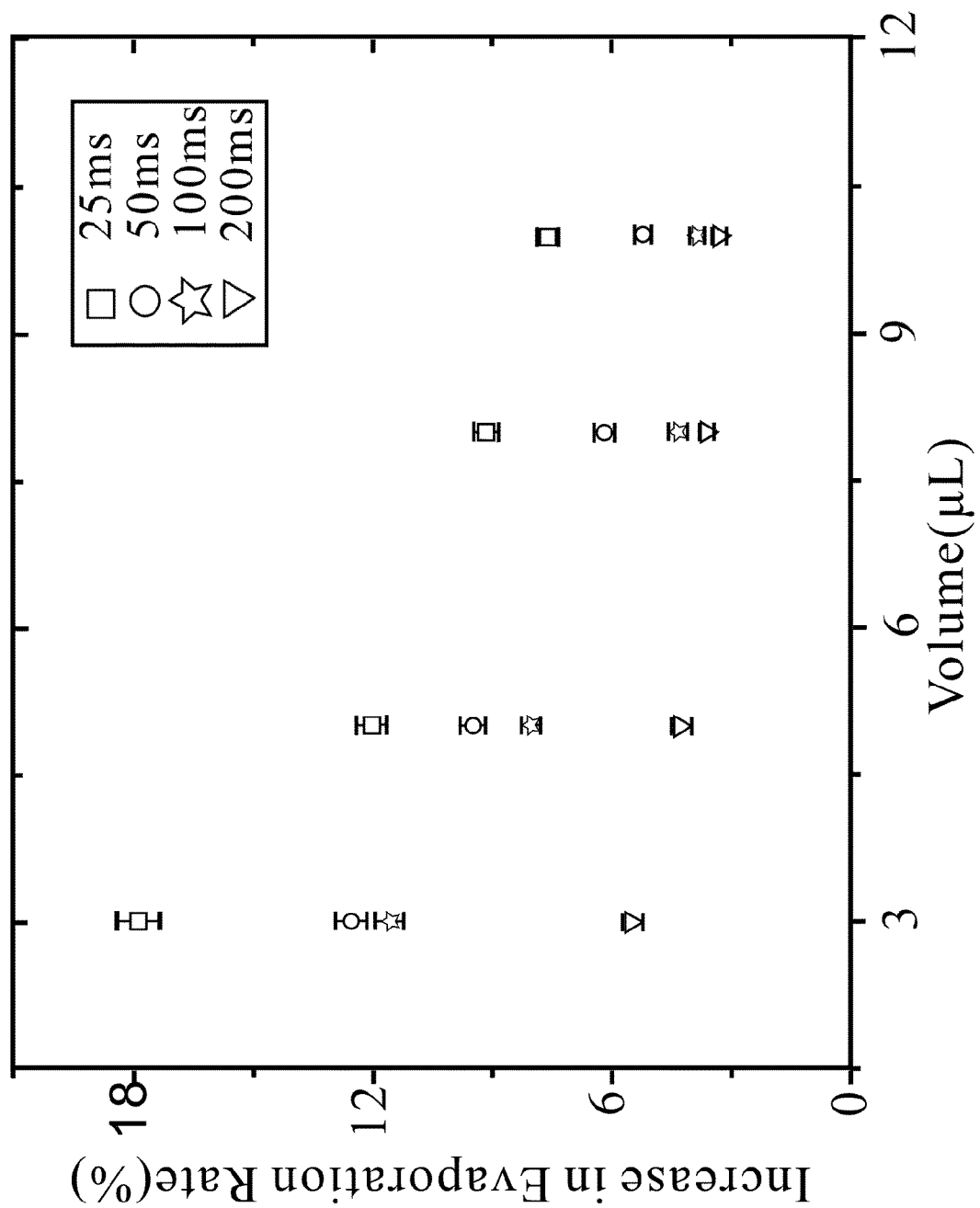
FIG. 7 is a schematic diagram showing a relationship between a volume of an oscillating droplet and an average maximum temperature according to an embodiment of the present disclosure.

As shown in FIG. 7, to investigate the impact of an alternating electric field on the droplet evaporation rate, additional experiments were conducted in this embodiment to make a comparison with direct current wetting (pulsing). In a 5-milliliter droplet experiment, the application of an alternating electric field (250 volts) within a frequency range of 2-20 Hz increased the evaporation rate by 6.04-6.6%. A percentage increase reduced as the frequency increased, i.e., the percentage increase was 3.45% at 200 Hz and 0.0092% at 1 KHz. However, for pulsed DC input (250 volts, 25 milliseconds), the evaporation rate of the same droplet increased by 11.15% (equivalent to the 20 Hz AC input). This indicates that a pulsed power source can further promote droplet evaporation.

Optionally, the friction nanogenerator has rotating blades, which, under the influence of natural wind or ocean currents, drive friction between different materials within the generator, generating an alternating high voltage. Compared to traditional high-voltage power sources, the friction nanogenerator can directly convert natural energy convert into high-voltage energy, and is structurally simple, compact, highly mobile, and suitable for on-the-go operations. During the oscillatory evaporation enrichment process of the droplets, the droplets move up and down in a fixed position on the superhydrophobic metal surface, avoiding the residue issues caused by back-and-forth movement on the surface in traditional approaches. This makes it suitable for non-destructive enrichment, improving the detection accuracy.

Under the influence of the alternating high-voltage electric field, the droplets are further heated, significantly reducing the time required for complete droplet evaporation and improving the efficiency of enrichment.

The present disclosure has the following beneficial effects:
1. The high-voltage power source based on the friction nanogenerator has the advantages of being green, self-powered, portable, highly mobile, and cost-effective.
2. The high-voltage array electrodes can be used for high-throughput manipulation of microdroplets containing analytes.
3. Oscillatory evaporation enrichment of droplets avoids the problem of analyte loss caused by traditional movement-based evaporation enrichment, achieving non-destructive and uniform enrichment.
4. The alternating high voltage from the friction nanogenerator not only drives droplet oscillation but also heats the droplets, thereby reducing the time required for droplet evaporation enrichment.
5. The combination of the friction nanogenerator and the handheld Raman spectrometer makes the entire biosensing platform compact and highly mobile, which is conducive to miniaturization and on-the-go operations.

Each embodiment in the description is described in a progressive mode, each embodiment focuses on differences from other embodiments, and references can be made to each other for the same and similar parts between embodiments.

Particular examples are used herein for illustration of principles and implementation modes of the present disclosure. The descriptions of the above embodiments are merely used for assisting in understanding the method of the present disclosure and its core ideas. In addition, those of ordinary skill in the art can make various modifications in terms of particular implementation modes and the scope of application in accordance with the ideas of the present disclosure. In conclusion, the content of the description shall not be construed as limitations to the present disclosure.

What is claimed is:

1. A self-powered, and portable Surface-Enhanced Raman Spectroscopy (SERS) biosensing platform, comprising: a handheld Raman spectrometer, a friction nanogenerator, a superhydrophobic metal substrate, and a high-voltage electrode array, wherein the friction nanogenerator has one end connected to the superhydrophobic metal substrate, and the other end connected to the high-voltage electrode array; the high-voltage electrode array is disposed above the superhydrophobic metal substrate; the friction nanogenerator is configured to provide an alternating voltage to the high-voltage electrode array; the high-voltage electrode array is configured to oscillate droplets on the superhydrophobic metal substrate according to the alternating voltage, and generate an eddy current to heat the droplets and accelerate evaporation of the droplets; and the handheld Raman spectrometer is configured to detect the enriched droplets, to obtain a SERS spectrum of an analyte.

2. The self-powered, and portable SERS biosensing platform according to claim 1, wherein the high-voltage electrode array comprises a plurality of electrodes arranged at equal intervals.

3. The self-powered, and portable SERS biosensing platform according to claim 2, wherein a distance between the electrodes and the superhydrophobic metal substrate is 5 mm.

4. The self-powered, and portable SERS biosensing platform according to claim 2, wherein the electrode has a diameter of 2.5 mm.

5. The self-powered, and portable SERS biosensing platform according to claim 2, wherein the electrodes are spaced by 5 mm.

6. The self-powered, and portable SERS biosensing platform according to claim 1, wherein the friction nanogenerator has a peak voltage ranging from 4 kV to 5 kV, and the friction nanogenerator has a rotation speed greater than or equal to 300 r/min.

7. The self-powered, and portable SERS biosensing platform according to claim 1, wherein the droplet has a volume of 7 μL.

* * * * *